(12) United States Patent
Mawlawi et al.

(10) Patent No.: US 9,706,575 B2
(45) Date of Patent: Jul. 11, 2017

(54) MULTIPLE ACCESS METHOD AND SYSTEM WITH FREQUENCY MULTIPLEXING OF SEVERAL REQUEST TO SEND MESSAGES PER SOURCE NODE

(71) Applicant: COMMISSARIAT A L'ENERGIE ATOMIQUE ET AUX ENE ALT, Paris (FR)

(72) Inventors: Baher Mawlawi, Grenoble (FR); Jean-Baptiste Dore, Saint Martin le Vinoux (FR); Jean-Marie Gorce, Massieux (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 53 days.

(21) Appl. No.: 14/533,480

(22) Filed: Nov. 5, 2014

(65) Prior Publication Data
US 2015/0124749 A1 May 7, 2015

(30) Foreign Application Priority Data
Nov. 6, 2013 (FR) .................... 13 60874

(51) Int. Cl.
*H04W 74/08* (2009.01)
*H04L 5/00* (2006.01)
*H04W 72/00* (2009.01)
*H04W 74/00* (2009.01)

(52) U.S. Cl.
CPC ....... *H04W 74/0816* (2013.01); *H04L 5/0005* (2013.01); *H04L 5/0053* (2013.01); *H04W 72/00* (2013.01); *H04W 74/004* (2013.01)

(58) Field of Classification Search
CPC .......... H04W 74/0816; H04W 74/004; H04W 72/00; H04L 5/0005; H04L 5/0053
See application file for complete search history.

(56) References Cited

U.S. PATENT DOCUMENTS

| 6,256,334 B1 * | 7/2001 | Adachi | ............... H04B 1/7143 370/252 |
| 2006/0045117 A1 * | 3/2006 | Qi | ......... H04W 24/02 370/445 |

(Continued)

FOREIGN PATENT DOCUMENTS

FR    3 008 266 A1    1/2015

OTHER PUBLICATIONS

French Preliminary Search Report issued Aug. 20, 2014, in French Application No. 13 60874 filed Nov. 6, 2013 (with English Translation of Categories of Cited Documents).

(Continued)

*Primary Examiner* — Mohammad Anwar
(74) *Attorney, Agent, or Firm* — Oblon, McClelland, Maier & Neustadt, L.L.P.

(57) ABSTRACT

The invention relates to a multiple access method to a frequency band of a communication channel of a communication network with carrier sensing and collision avoidance, said frequency band being broken down into a set of sub-bands (SB0, SB1, . . . , SBi, . . . , SBn) of the communication channel, characterized in that it comprises at a source node, after it has been detected that the communication channel is available, the transmission to a destination node of several request to send messages on the communication channel (RTS NS0, RTS NS1), each of said messages being sent on a sub-band of the communication channel.

15 Claims, 7 Drawing Sheets

(56) References Cited

U.S. PATENT DOCUMENTS

| | | | |
|---|---|---|---|
| 2009/0196273 A1 | 8/2009 | Kwon et al. | |
| 2011/0317633 A1 | 12/2011 | Tan et al. | |
| 2014/0119316 A1* | 5/2014 | Linden | H04L 5/0048 370/329 |
| 2014/0125423 A1 | 5/2014 | Pebay-Peyroula et al. | |
| 2014/0126623 A1 | 5/2014 | Dore et al. | |
| 2015/0009906 A1 | 1/2015 | Dore et al. | |
| 2015/0063507 A1 | 3/2015 | Dore et al. | |

OTHER PUBLICATIONS

Haile Gebreselassie, et al., "C-OFDMA: Improved Throughput for Next Generation WLAN Systems Based on OFDMA and CSMA/CA", 2013 $4^{th}$ International Conference on Intelligent Systems, Modelling and Simulation, IEEE, Jan. 29, 2013, 6 pgs.

Junwoo Jung, et al., "Group Contention-Based OFDMA MAC Protocol for Multiple Access Interference-Free in WLAN Systems", IEEE Transactions on Wireless Communications, vol. 11, No. 2, Feb. 1, 2012, 11 pgs.

U.S. Appl. No. 14/547,625, filed Nov. 19, 2014, Dore, et al.

Jo Woon Chong, et al., "RawPEACH: Multiband CSMA/CA-Based Cognitive Radio Networks" Journal of Communications and Networks, vol. 11, No. 2, Apr. 2009, pp. 174-185.

Giuseppe Bianchi, "IEEE 802.11-Saturation Throughput Analysis" IEEE Communications Letters, vol. 2, No. 12, Dec. 1998, pp. 318-320.

U.S. Appl. No. 14/790,708, filed Jul. 2, 2015, Dore.

U.S. Appl. No. 14/771,394, filed Aug. 28, 2015, Dore, et al.

\* cited by examiner

MULTIPLE ACCESS METHOD AND SYSTEM WITH FREQUENCY MULTIPLEXING OF SEVERAL REQUEST TO SEND MESSAGES PER SOURCE NODE

TECHNICAL DOMAIN

The domain of this invention is multiple access to a frequency band of a communication network with carrier sensing and collision avoidance.

STATE OF PRIOR ART

Carrier Sense Multiple Access/Collision Avoidance>> (CSMA/CA) is a multiple access protocol that can be used in radiocommunication systems to manage allocation of the radio resource.

This protocol is used to avoid collisions between multiple users (source nodes) that would like to simultaneously access a common access point (destination node) on the up link.

In one implementation of this protocol, a source node that would like to send data senses the communication channel. If the channel is occupied, a duration (expressed as a number of time slots) of a backoff counter is chosen at random within a [0, CW−1] interval, where CW is a contention window. The backoff counter is decremented by 1 every time that the channel is detected as being available for a duration DIFS (<<Distributed Inter-Frame Space>>). The backoff counter is stopped when the channel is occupied and it starts again when the channel is once again available for at least the duration DIFS.

When the backoff counter reaches zero, the source node sends a <<Request To Send>> (RTS) message to the destination node, and waits until it receives a <<Clear To Send>> (CTS) message from the destination node before sending the data. After reception of all sent data and immediately after expiration of a SIFS (<<Short Inter-Frame Space>>) duration, the destination node sends an ACK (<<ACKnowledgment>>) message.

The contention window CW is an integer within an interval $[CW_{min}, CW_{max}]$. This window CW is initially set equal to the minimum value $CW_{min}$. Every time that a source node is involved in a collision, it increases its backoff time by doubling the CW window, up to the maximum value $CW_{max}$. On the other hand, if a transmission is successful, the source node reduces the CW window to its minimum value $CW_{min}$.

A CSMA/CA system in conventional single-channel operation has the advantage that it requires neither signalling for a passband request, nor an allocation according to a planned access. On the other hand, it is not very efficient in that its performances degrade quickly as the number of source nodes increases. This limitation may be overcome by using a multiple access by distribution to several sub-bands by which several source nodes can send on different sub-bands simultaneously, the source nodes knowing the availability state of each of the sub-bands at every instant. This multiple access by distribution on different sub-bands for example makes use of the OFDMA (<<Orthogonal Frequency Division Multiple Access>>) access method by which the spectral resource (passband) is divided into a set of orthogonal sub-carriers. This set of sub-carriers is itself divided into sub-sets, each sub-set of sub-carriers forming a sub-band forming a communication channel. The source nodes thus compete for access to the resource both in time and in frequency.

For example, the article by J. W. Chong, Y. Sung, and D. K. Sung entitled "RawPEACH: Multiband CSMA/CA-Based Cognitive Radio Networks", Communications and Networks, Journal of, vol. 11, no. 2, pp. 175-186, 2009, describes a CSMA/CA system in multi-channel operation. According to this system, the allocated pass band B is divided into $N_{CH}$ sub-bands and each sub-band is divided into time slots with duration $T_s$, the boundaries between the time slots being synchronised between the sub-bands. This system is aimed particularly at providing a given service quality for some high priority users (qualified as primary users). One channel is thus reserved for each primary user, that consists of providing the user with a competition-free channel, orthogonal to other channels, consisting of a sequence of sub-bands on which it can send its data. Three competition-free channels A, B and C are defined, with reference to FIG. 2 in this document. Channel A skips between sub-bands B1, B3 and B1, but the user to which this channel is assigned only sends from t to $t+T_{f,p}$, such that this channel A is released at $T_{f,p}$. The channel C skips between sub-bands B3, B1 and B2, and the user to which this channel is assigned sends on each of the three represented intervals.

If the number of primary users is more than the number $N_{CH}$ of sub-bands, orthogonality between the primary users cannot be maintained. Thus, the number of users is at most equal to the number $N_{CH}$ of sub-bands. This system then requires an admission control to reject a request from a user who would like to be treated as a primary user when all primary channels are used. The user thus rejected can then initiate a session as a lower priority secondary user.

Under low or medium traffic conditions, it is probable that resources are not entirely occupied by primary users. These time and/or frequency resources can then be used for secondary users. The authors of this article propose that the conventional single-band CSMA/CA protocol should be used on each sub-band for secondary users, simply by adapting it so that the backoff counters of secondary users are paused when all sub-bands are occupied due to transmission by primary users. If at least one sub-band is detected as being not occupied by a primary user, each secondary user decrements its backoff counter by 1. When a backoff counter reaches zero, the associated secondary user begins to send its data on a sub-band selected at random among the at least one sub-band not occupied by a primary user. If more than one secondary user is sending data on the same sub-band simultaneously, a collision occurs.

Another example of the CSMA/CA system in multi-band operation is given in publication US 2009/0196273 A1 that gives another method of managing the backoff counter. In this publication, if one of the sub-bands is detected as being available over a duration corresponding to a backoff slot, a source node decrements its backoff counter by a value corresponding to the number of available sub-bands. When the backoff counter of a source node reaches zero, the source node selects one of the available sub-bands at random and sends its data. The boundaries of backoff slots are synchronized within the various sub-bands and a source node is only authorised to begin waiting or to send at the beginning of each slot.

PRESENTATION OF THE INVENTION

The purpose of the invention is to provide a technique for improving the transmission capacities of an CSMA/CA system and consequently discloses a multiple access method to a frequency band of a communication channel of a communication network with carrier sensing and collision avoidance, said frequency band being broken down into a set of sub-bands of the communication channel, characterised in that it comprises at a source node, after it has been detected that the communication channel is available, the transmission to a destination node of several request to send messages on the communication channel, each of said messages being sent on a sub-band of the communication channel.

The invention also applies to a multiple access method to a frequency band of a communication channel of a communication network with carrier sensing and collision avoidance, said frequency band being broken down into a set of sub-bands of the communication channel, comprising the following at a destination node:

detection of simultaneous request to send messages on the communication channel sent by a plurality of source nodes on a plurality of sub-bands;

transmission of a clear to send message on the communication channel through at least one source node among said plurality of source nodes, said message including an information field giving the number of request to send messages to be sent by each source node on the communication channel, each on a sub-band of the communication channel.

Some preferred but not limitative aspects of these methods are described below:

the number of request to send messages on the communication channel transmitted by the source node depends on a priority level assigned to the source node;

they include a selection by the source node of sub-bands on which each request to send message is sent on the communication channel;

they include evaluation of a communication channel load, and whether or not the number of request to send messages on the communication channel transmitted by the source node is modified after it has been detected that the communication channel is available, depending on the result of said evaluation.

The invention is also applicable to a destination node and a source node configured for implementation of these methods, and a communication network comprising such nodes. Finally, it is applicable to a computer program containing code instructions to execute the steps of these methods when said program is run on a computer.

BRIEF DESCRIPTION OF THE DRAWINGS

Other aspects, purposes, advantages and characteristics of the invention will become clear after reading the following detailed description of preferred embodiments of this invention, given as non-limitative examples with reference to the appended drawings on which.

DETAILED PRESENTATION OF PARTICULAR EMBODIMENTS

A first aspect of the invention applies to a multiple access method to a frequency band of a communication channel of a communication network, for example a wireless network, with carrier sensing and collision avoidance.

With reference to FIGS. 1 to 4, the frequency band is broken down into a set of sub-bands SB0, SB1, . . . , SBi, . . . , SBn of the communication channel, said sub-bands being used as will be described later for transmission from a source node NS0, NS1, NS2 to a destination node of request to send messages on the communication channel <<RTS NS0>>, <<RTS NS1>>, <<RTS NS2>>. More particularly, the invention discloses frequency multiplexing for transmission of request to send messages on the communication channel, several source nodes possibly sending such messages simultaneously on different sub-bands.

This frequency multiplexing may for example use the OFDMA (<<Orthogonal Frequency Division Multiple Access>>) access method whereby the spectral resource (passband) is divided into a set of orthogonal sub-carriers. This set of sub-carriers is itself broken down into sub-sets, each sub-set of sub-carriers forming a sub-band.

This frequency multiplexing may also use other multi-carrier modulation types, for example such as an FBMC (<<Filter Bank based Multi-Carrier>>) system.

For this invention, each source node may have a backoff counter for which the value is modified (typically decremented by 1) when it is detected that the communication channel is available for a given duration (DIFS duration in the context of the CSMA/CA protocol). The communication channel is available when no transmission is made on the set of sub-bands SB0, SB1, . . . , SBi, . . . , SBn of the communication channel.

When the backoff counter of a source node reaches a predetermined value (typically zero), the source node sends its data after the use of a modified RTS/CTS system.

French patent application number 13 56518 filed on Jul. 3, 2013 disclosed a modified RTS/CTS system according to which the source node sends a request to send message on the communication channel (RTS type message) on one or several sub-bands forming a subset of said set of sub-bands of the communication channel (in other words, the message is not sent on all sub-bands).

This invention makes use of another modified RTS/CTS system by which the source node may send a plurality N of request to send messages on the communication channel, each of said N messages being sent on one of the sub-bands of the communication channel.

Figure 1:
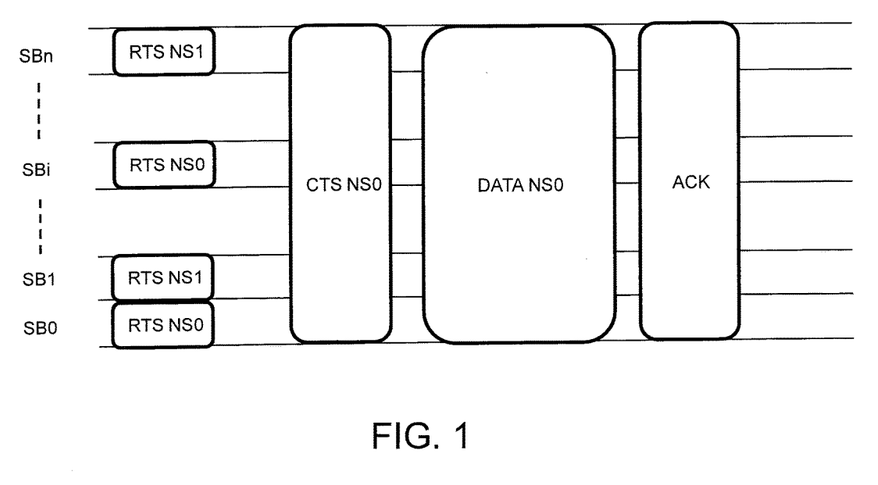
FIGS. 1 to 3 are diagrams showing data transiting on the different sub-bands in a first embodiment of the invention.

For example, and with reference to FIG. 1, the source node NS0 sends a plurality (N=2) of <<RTS NS0>> messages, namely one message on sub-band SB0 and one message on sub-band SBi. The source node NS1 also sends a plurality (N=2) of <<RTS NS1>> messages, namely one message on sub-band SB1 and one message on sub-band SBn.

In one variant embodiment that will be described later, this number N of RTS type messages that a source node can send on one of the sub-bands of the communication channel can be modified in time. Consequently, the invention covers not only cases in which one source node always sends several RTS type messages for which the quantity may be modified, but also the case in which under some conditions the source node only sends one RTS type message, and under other conditions the source node sends a plurality of RTS type messages.

The invention can reduce the probability of collision by N for each source node. In the modified RTS/CTS system according to the patent application mentioned above, the request to send message on the communication channel sent by a source node is incorrectly received by the destination node when the corresponding message collides with one or several other messages. In the modified RTS/CTS system according to the invention, the request to send messages on the communication channel sent by a source node can only be received incorrectly by the destination node if all the corresponding N messages collided with other messages.

Figure 2:
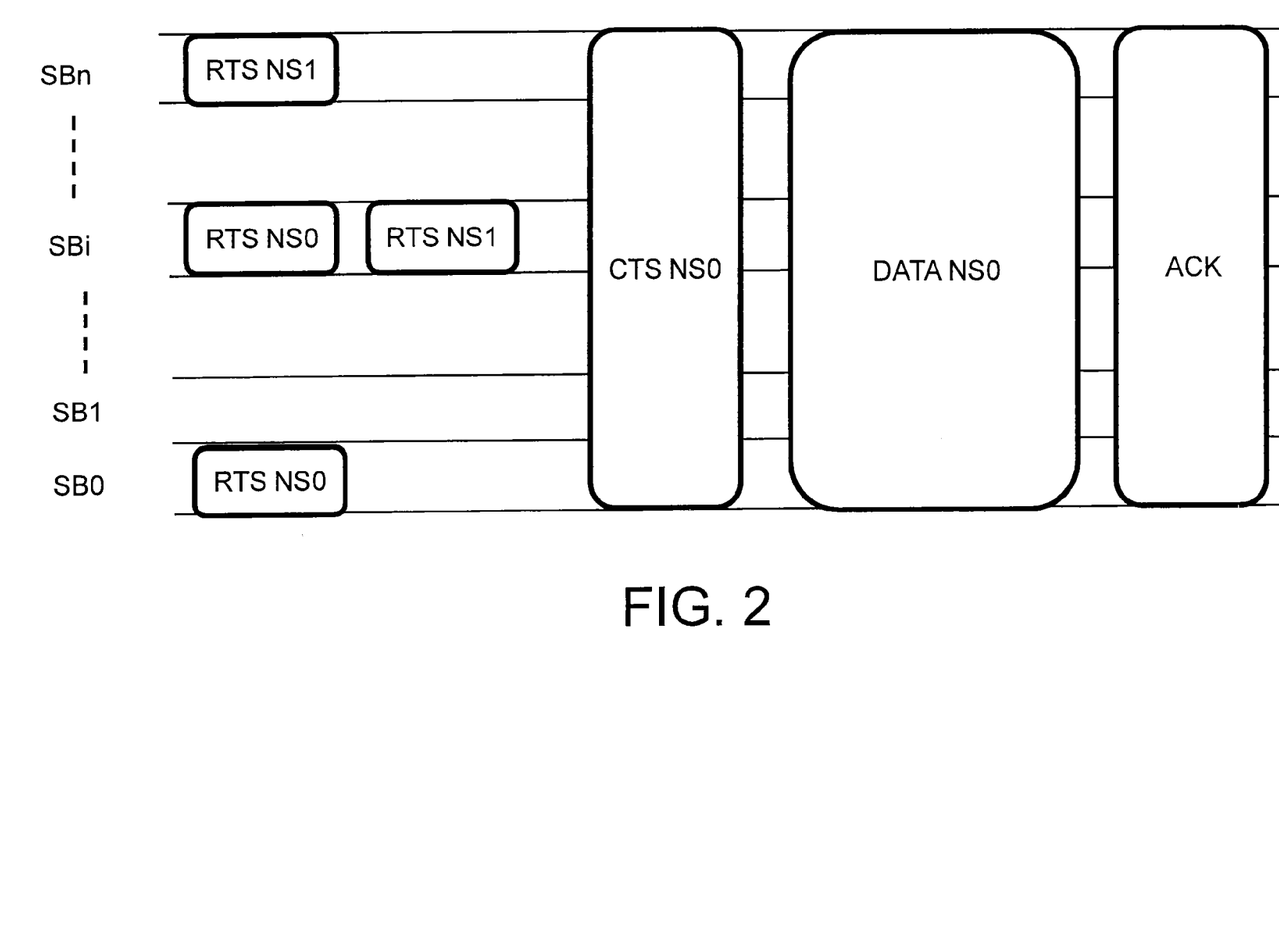

FIG. 2 shows an example collision in a sub-band that does not affect correct reception by the destination node of a request to send message on the communication channel, sent by a source node. In this example, the source node NS0 sends an <<RTS NS0>> message on sub-band SB0 and an <<RTS NS0>> message on sub-band SBi. The source node NS1 sends an <<RTS NS1>> message on sub-band SBi and an <<RTS NS1>> message on sub-band SBn. The <<RTS NS0>> and <<RTS NS1>> messages collide on the sub-band SBi. However, due to the diversity available due to transmission of several RTS type messages on several sub-bands, no collision occurs on sub-band Sbn, and no collision occurs on the sub-band SB0. Therefore the <<RTS NS0>> and <<RTS NS1>> messages sent on sub-band SB0 and on sub-band SBn respectively are received correctly by the destination node.

In one embodiment, sub-bands for transmission of request to send messages on the communication channel by a source node are imposed, for example through a list of sub-bands that the source node may know.

Figure 7:
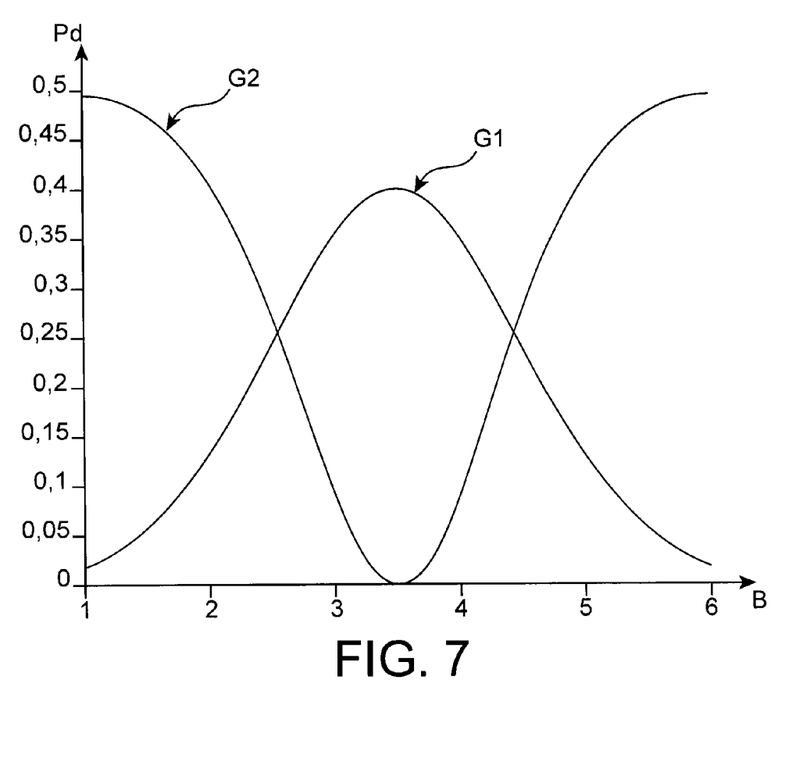
FIG. 7 shows an example of the distribution probability law of request to send messages on the communication channel, on the different sub-bands.

In another embodiment, the source node selects the sub-band(s) for transmission of the request to send messages on the communication channel. The selection may use a distribution probability law on each sub-band of the communication channel or on each sub-band of a sub-set of the set of sub-bands imposed at the source node. The probability law may be a random law. This law may be in more sophisticated forms, for example as in the case shown in FIG. 7 which includes a distribution law on six sub-bands B depending on whether the source node belongs to a first group G1 covering sub-bands 2-5 or to a second group G2 covering sub-bands 1 and 6. In this example, source nodes in the first group G1 send on sub-bands 2-5 with distribution probabilities Pd equal to 0.15, 0.35, 0.35 and 0.15 respectively, while the source nodes in the second group G2 send on sub-band 1 or 6 with the same distribution probability Pd 0.5.

Figure 3:
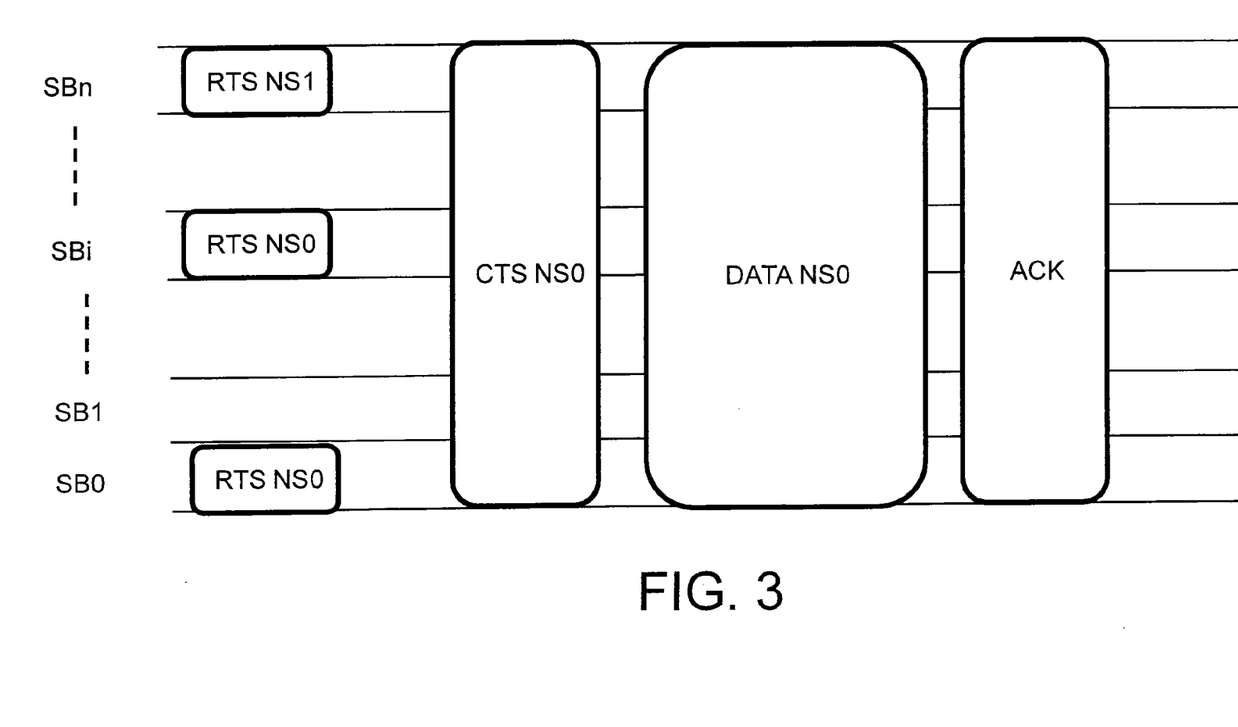

In one embodiment shown in FIG. 3, the number of request to send messages on the communication channel transmitted by the source node depends on a priority level associated with the source node. In the example in FIG. 3, node NS0 has a higher priority than node NS1 and then sends more RTS type messages than node NS1, namely two <<RTS NS0>> type RTS messages (in this case on sub-bands SB0 and SBi) while node NS1 only sends a single <<RTS NS1>> type RTS message (in this case on sub-band SBn). It will be understood that the high priority source node then has higher chance of correct reception of at least one of its RTS type messages and consequently more probable access to the communication channel.

The destination node comprises a detection unit configured to detect simultaneous request to send messages on the communication channel (simultaneous <<RTS NS0>> and <<RTS NS1>> messages in FIGS. 1 to 3; simultaneous <<RTS NS0>>, <<RTS NS1>> and <<RTS NS2>> messages in FIG. 4), said messages having been sent by a plurality of source nodes on a plurality of sub-bands. The destination node also comprises a transmission unit configured to transmit a clear to send message on the communication channel through at least one source node among said plurality of source nodes <<CTS NS0>>, <<CTS NS0&NS1>>. The source node(s) authorised to send on the communication channel then send their data (<<DATA NS0>>, <<DATA NS1>>) on the communication channel, in other words on all sub-bands in the communication channel. The destination node sends an acknowledgement message ACK once the data transmission is complete, if it is successful.

In one embodiment, the clear to send message on the communication channel through at least one source node among said plurality of source nodes <<CTS NS0>>, <<CTS NS0&NS1>> is also sent on the communication channel, on all sub-bands.

In another embodiment, the destination node may send several clear to send messages on the communication channel through at least one source node among said plurality of source nodes, each of said messages being sent on one or several sub-bands forming a sub-set of said set of sub-bands.

In one embodiment, the clear to send message on the communication channel through at least one source node among said plurality of source nodes <<CTS NS0>>, <<CTS NS0&NS1>> comprises an information field giving the availability of each sub-band.

According to the invention, the detection unit of the destination node is configured to sense each sub-band and detect simultaneous request to send messages originating from a plurality of source nodes. Simultaneous messages refer to messages sent by source nodes in a single time slot when the source nodes and the destination node are synchronised, or messages sent by source nodes in a single time window beginning with the availability of the communication channel and taking account of the duration necessary to maintain availability before transmission (DIFS type) and the propagation time for the different source nodes.

With reference to FIGS. 1 to 3, the destination node may thus detect two simultaneous <<RTS NS0>>, <<RTS NS1>> request to send messages on the communication channel originating from two source nodes NS0, NS1. In the context of a conventional CSMA/CA protocol, the two messages would have been sent simultaneously on the communication channel in which they would have collided, such that neither of the two source nodes could have sent. In the scope of the invention, the risk of collision is very much reduced because each of the messages is sent on a sub-band. And this risk is obviously much lower when there is a large number of sub-bands. Since the probability of collision of simultaneous RTS messages is lower, the global performance of the system is improved.

On the other hand, in the case of messages sent simultaneously on a same sub-band, these messages collide and cannot be sensed by the destination node.

In one embodiment, the destination node makes a random selection of one or several source nodes among the plurality of source nodes that simultaneously sent a request to send message on the communication channel on one or several sub-bands.

In another embodiment, the destination node makes a selection based on a priority level associated with each source node of one or several source nodes among the plurality of source nodes that simultaneously sent a request to send message on the communication channel on one or several sub-bands (for example by selecting higher priority source node(s) so as to guarantee a certain level of service quality).

With reference to FIGS. 1 to 3 illustrating a first embodiment of the invention, a single source node NS0 is selected (at random or due to its priority level) and the selected source node sends a clear to send message <<CTS NS0>> on the entire communication channel. After reception of the clear to send message <<CTS NS0>>, the selected source node NS0 sends its data <<DATA NS0>> on the entire communication channel and then waits for an acknowledgement message <<ACK>> sent by the destination node also on the entire communication channel.

A second embodiment of the invention allows for sending data from a set of source nodes, possibly including up to m source nodes. If the number n of simultaneous request to send messages on the communication channel is less than the number m, then the n source nodes are selected. On the other hand, if the number n of request to send messages is more than m, the destination node then selects m source nodes among n, either at random or depending on their priority level.

Figure 4:
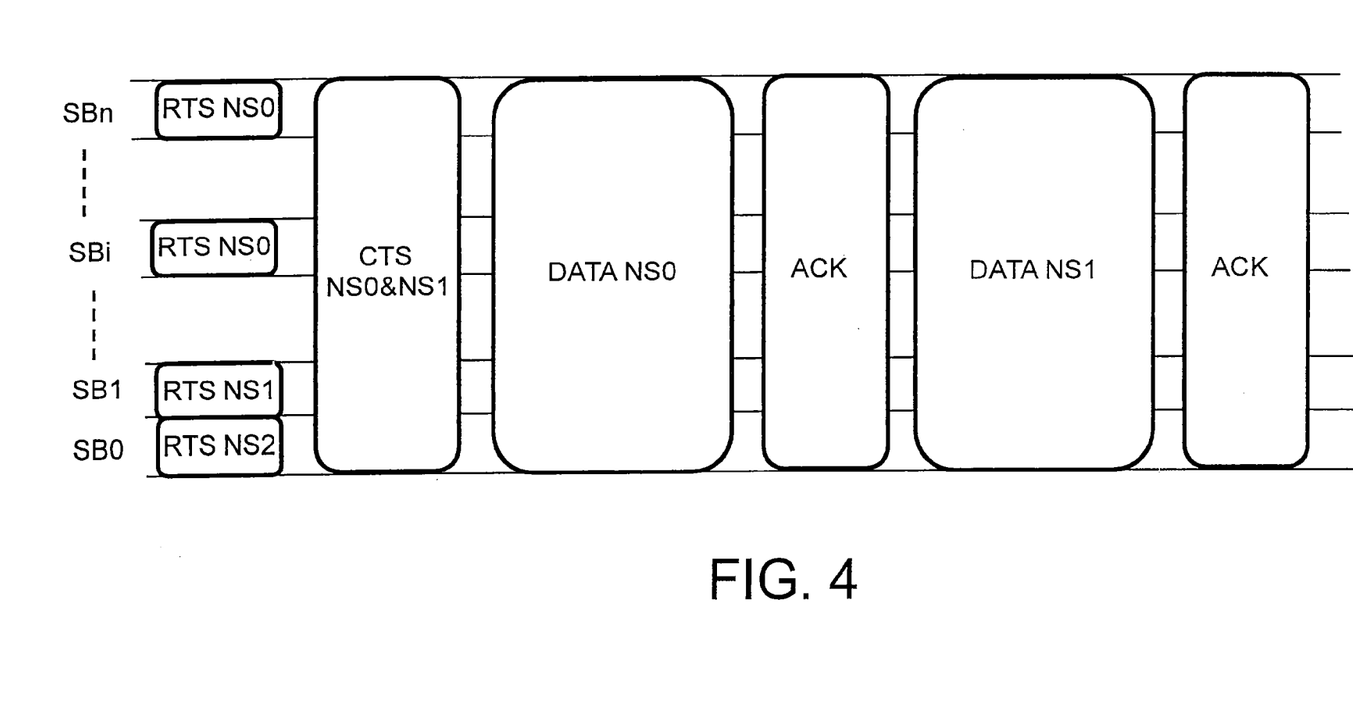
FIG. 4 is a diagram showing data transiting on the different sub-bands in a second embodiment of the invention including consecutive transmission of data from the two source nodes.

The destination node sends a clear to send message on the communication channel by a set of source nodes (when n≤m, said set including all the nodes in said plurality of source nodes, and when n>m, said set including only some of them) including an information field, for each source node in said set, of an immediate or delayed transmission after sensing one or several acknowledgment messages sent by the destination node on the communication channel. With reference to FIG. 4, the source nodes NS0 and NS1 are selected, and the clear to send message on the communication channel by the selected <<CTS NS0&NS1>> source nodes includes an information field indicating an immediate transmission from the first source node NS0 and a delayed transmission from the second source node NS1 after sensing to a acknowledgement message ACK for data sent by the destination node. Thus, after reception of the <<CTS NS0&NS1>> clear to send message, the source node NS0 sends its data <<DATA NS0>> on the entire communication channel and then waits for an acknowledgment message <<ACK>> sent by the destination node, for example on the entire communication channel. After sensing the acknowledgment message, the source node NS1 sends its data <<DATA NS1>> and then waits for an acknowledgment message <<ACK>>.

In order to study the performances of the invention, the saturation throughput is calculated corresponding to the throughput assuming that each source node always has a packet to send. As mentioned in the article by G. Bianchi entitled "IEEE 802.11-Saturation Throughput Analysis," IEEE Communications Letters, vol. 2, no. 12, pp. 318-320, December 1998, the throughput S corresponds to the time fraction at which a channel is used to successfully send useful load data:

$$S = \frac{Ps \cdot Ptr \cdot L}{Ps \cdot Ptr \cdot Ts + Ptr \cdot (1 - Ps) \cdot Tc + (1 - Ptr) \cdot Tid}$$

where Ptr is the probability of having at least one transmission on the time slot considered, Ps is the possibility of having a failure-free transmission,
L is the size of an average payload packet;
Ts is the average time necessary to send a packet size L;
Tc is the average collision duration;
Tid is the duration of the availability period.

We have Ts=RTS+SIFS+σ+CTS+SIFS+σ+H+L+SIFS+σ+ACK+DIFS+σ and Tc=RTS+DIFS+σ, where H, L and ACK are transmission times of the packet header, of the packet payload and of the acknowledgement message, and a is the propagation time.

The selected protocol and channel parameters are those specified by the physical layer 802.11 FH PHY, while the minimum size $W_{min}$ of the contention window is chosen to be constant and equal to 16.

Figure 5A:
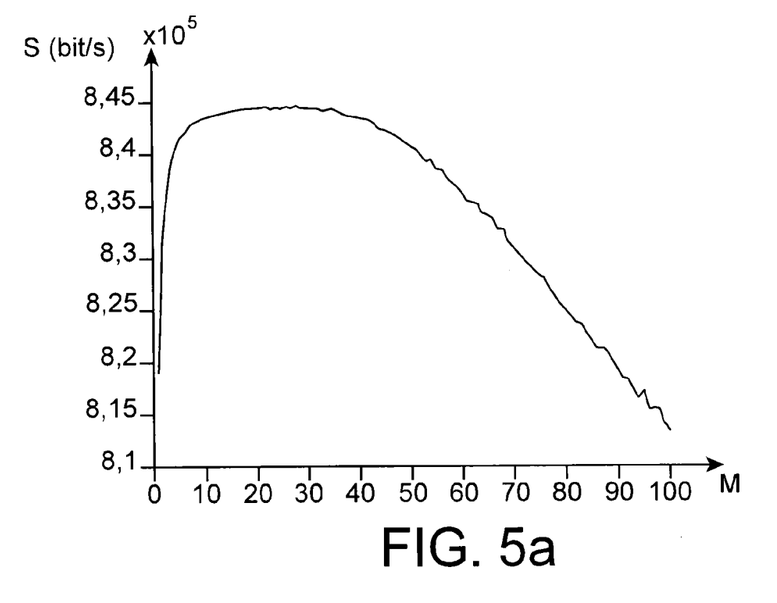
FIGS. 5a and 5b show the saturation throughput as a function of the number of source nodes in a system comprising six sub-bands with transmission by a source node of two request to send messages on the communication channel on two sub-bands, and of one request to send message on the communication channel on one sub-band, respectively.
Figure 5B:
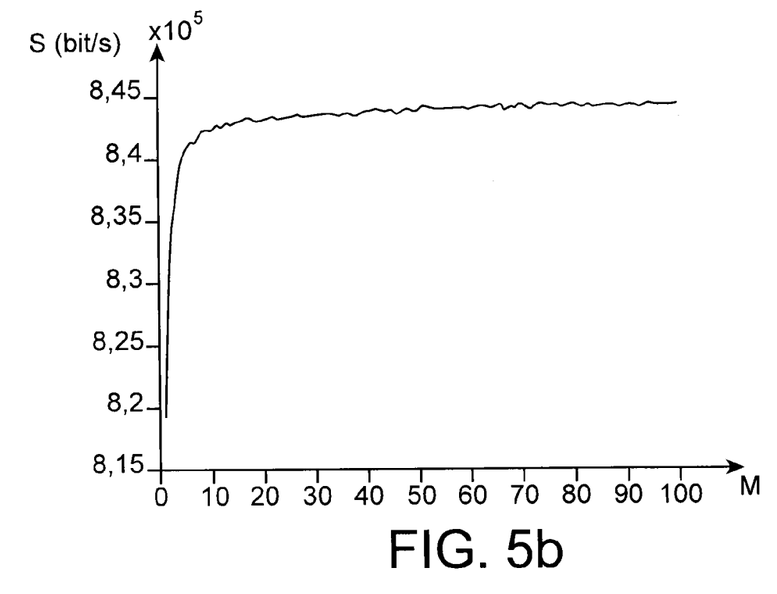

FIGS. 5a and 5b show the saturation throughput S as a function of the number M of source nodes in a system comprising six sub-bands with transmission by a source node of either two request to send messages on the communication channel on two sub-bands (FIG. 5a) or a single message on one sub-band (FIG. 5b).

Figure 5C:
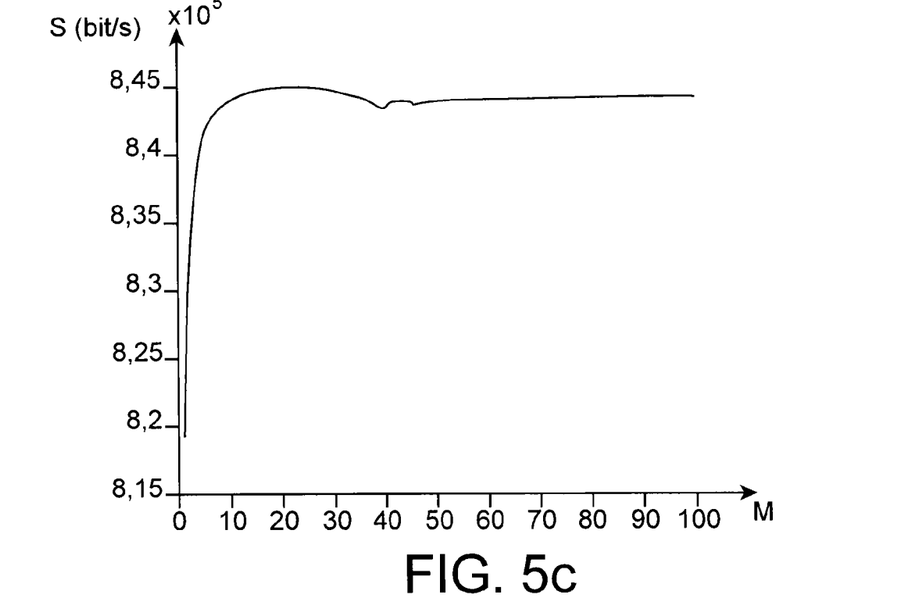
FIG. 5c shows the saturation throughput as a function of the number of source nodes in a system comprising six sub-bands in the framework of a variant of the invention in which the number of request to send messages on the communication channel sent by a source node depends on the number of source nodes.

FIG. 5c shows the saturation throughput S as a function of the number M of source nodes in a system comprising six sub-bands in the context of a variant of the invention in which the number of request to send messages on the communication channel sent by a source node depends on the number of source nodes. More precisely, when the number M of source nodes is less than 40, each source node sends a plurality (in this case N=2) of RTS type messages, according to the invention, each on one sub-band. This thus reduces the probability of collision between source nodes and they have a better chance of accessing the communication channel. And in accordance with a variant embodiment of the invention, the number of RTS type messages transmitted by the source node is modified. In this example, when the number M of source nodes is more than 40, each source node only sends a single RTS type message, on one sub-band. The global performance is thus improved, benefiting from the performances of the multi-RTS strategy with a small number of source nodes and the performances of the single-RTS strategy with a large number of source nodes.

In the above example, only one modification is made to the number of RTS messages. However, the invention is not limited to this case, nor to the examples of 2 and then 1 RTS messages sent, but in general includes multiple modifications to the number of RTS messages sent with at least the use of a multi-RTS strategy.

In the context of this variant, the method according to the invention includes the evaluation of a communication channel load, and the number of request to send messages on the communication channel transmitted by the source node may or may not be modified after detection of the availability of the communication channel, depending on the result of said evaluation. This modification may possibly be accompanied by a change in the distribution probability law used by the source node to select the sub-band(s) for transmission of the request to send messages on the communication channel.

As disclosed in the above example, the evaluation of the channel load may include determination of the number of source nodes capable of communicating with the destination node. For example, this is the case when the source nodes declare themselves to the destination node, the destination node then knows the number of source nodes. For example, a declaration may be made by sending a data preamble containing information about the new source node that has just connected to the destination node, during a dedicated and determined time interval.

The channel load may be evaluated by the destination node, for example by evaluating the average rate at which its backoff counter decrements, a large channel load resulting in low decrement rate. Or for example, it can also be done by estimating the number of <<idle>> time slots during which no data are sent or exchanged between the source node and the destination nodes. A reduction in the number of these slots may be caused by the fact that the network is becoming more highly loaded.

The evaluation of the channel load may also include determination of a failure or success rate of transmissions of request to send messages on the communication channel by a source node to the destination node. Each source node can thus be configured to calculate its average collision rate on the communication channel, in which a collision on the communication channel occurs when request to send messages on the communication channel transmitted by the source node are all involved in a collision on the sub-band on which they are sent. If this average collision rate is less than a threshold Pcs, then the source node sends m0 RTS type messages, each on one sub-band. And if this average collision rate is more than the threshold PCs, the source node sends m1 RTS type messages, each on one sub-band, where m1 is typically less than m0.

Figure 6:
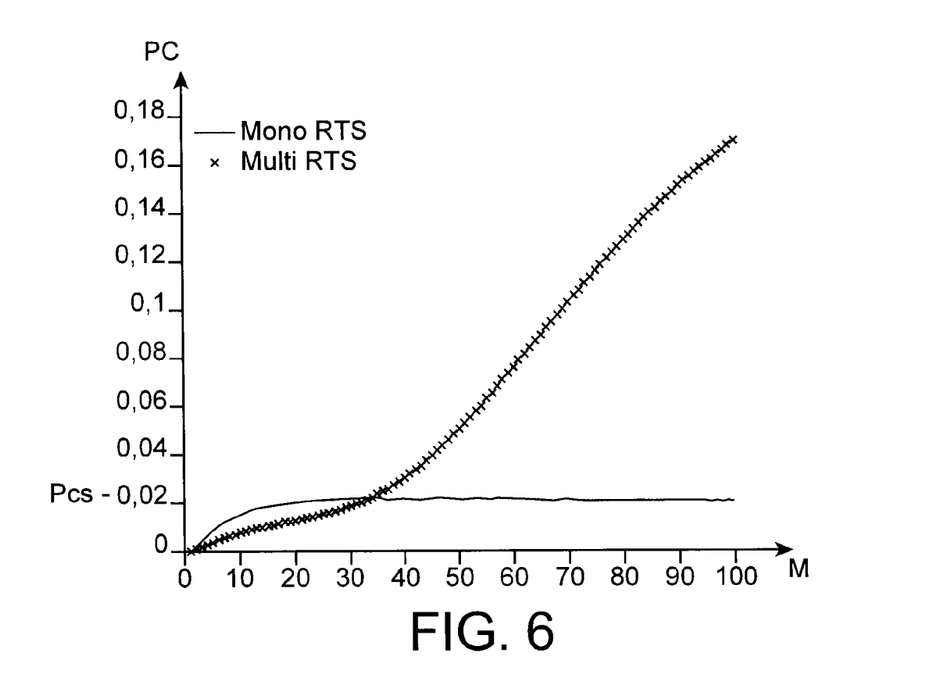
FIG. 6 shows the probability of collision as a function of the number of source nodes in a system comprising six sub-bands with transmission, by a source node, of either two request to send messages on the communication channel on two sub-bands, or one message on one sub-band.

FIG. 6 shows the probability of collision as a function of the number of source nodes in a system comprising six sub-bands in which a source node sends either two (m0=2) request to send messages on the communication channel on two sub-bands (Multi RTS curve), or a single message (m1=1) on one sub-band (Single-RTS curve). The threshold PCs may then be determined as being the intersection of these two curves (with 6 sub-bands, m0=2 and m1=1, the threshold PCs is equal to 0.02).

The invention is not limited to the method as described above, but it also includes a destination node in a multiple access communication network with one frequency band of a communication channel with carrier sensing and collision avoidance, including:
  a detection unit configured to detect simultaneous request to send messages on the communication channel originating from a plurality of source nodes on a plurality of sub-bands,
  a transmission unit configured to transmit a clear to send message on the communication channel through at least one source node among said plurality of source nodes, said message including an information field giving the number of request to send messages on the communication channel that each source node should transmit, each on a sub-band of the communication channel.

The clear to send CTS message on the communication channel can thus inform each source node of the strategy to be used concerning the number of RTS type messages to be sent, this strategy possibly also containing information about the selection of sub-bands (distribution probability law type, limitation to a group of sub-bands, etc.).

The invention also relates to a source node of a multiple access communication network with a single frequency band of a communication channel with carrier sensing and collision avoidance, said frequency band being broken down into a set of sub-bands of the communication channel, including a detection unit configured to detect availability of the communication channel, characterised in that it comprises a transmission unit configured to transmit a plurality of request to send messages on the communication channel to a destination node, each on one sub-band of the communication channel.

The invention also relates to a multiple access communication network with a single frequency band of a communication channel with carrier sensing and collision avoidance, including a destination node and/or a source node according to the invention.

The invention also includes computer program product containing code instructions to execute the detection, selection and transmission steps used by the different units of the destination node, when said instructions are executed on a computer. The invention also includes software containing code instructions to execute the detection and transmission steps used by the different units of the source node, when said instructions are executed on a computer.

The invention claimed is:

1. A multiple access method to a frequency band of a communication channel of a communication network with carrier sensing and collision avoidance, said frequency band being broken down into a set of sub-bands of the communication channel, the method comprising at a source node:
    after it has been detected that the communication channel is available, a step of transmitting to a destination node a plurality of messages requesting authorization to send data on the communication channel, each of said messages being sent on a separate sub-band of the same communication channel;
    after having received a message authorizing the sending of data on the communication channel by the source node, a step of transmitting the data to the destination node over all the sub-bands of the same communication channel; and
    performing an evaluation of a communication channel load, and depending on a result of said evaluation, a number of messages requesting authorization to send data on the communication channel transmitted by the source node is modified or not after it has been detected that the communication channel is available.

2. The method according to claim 1, in which the number of messages requesting authorization to send data on the communication channel transmitted by the source node depends on a level of priority associated with the source node.

3. The method according claim 1, comprising a selection by the source node of the sub-bands on which the messages requesting authorization to send data on the communication channel are to be sent.

4. The method according to claim 1, wherein the set of sub-bands includes a plurality of groups of sub-bands, and in which the source node is associated with a first group of sub-bands and performs the transmission of the messages requesting authorization to send data on the communication channel on separate sub-bands of the first group of associated sub-bands, and in which another node is associated with a second group of sub-bands and performs transmission of messages requesting authorization to send data on the communication channel on separate sub-bands of the second group of associated sub-bands.

5. The method according to claim 1, in which the evaluation of the channel load includes determining of the number of source nodes capable of communicating with the destination node.

6. The method according to claim 1, in which the evaluation of the channel load includes determining a failure or success rate of transmissions of the messages requesting authorization to send data on the communication channel by the source node to the destination node.

7. The method according to claim 6, in which the failure rate is an average collision rate on the communication channel, a collision on the communication channel occurring when the messages requesting authorization to send data on the communication channel transmitted by the source node are each involved in a collision on the sub-band on which it is sent.

8. The method according to claim 1, comprising at the destination node the steps of:
  detecting simultaneous messages requesting authorization to send data on the communication channel sent by a plurality of source nodes on a plurality of sub-bands,
  transmitting a message authorizing the sending of data on the communication channel message by at least one source node among said plurality of source nodes, and
  receiving the data transmitted by said at least one source node over all the sub-bands of the communication channel.

9. The method according to claim 8, in which the destination node sends a messages authorizing the sending of data by a set of source nodes, said set of source nodes comprising all or some of the nodes in said plurality of source nodes, said message including an information field, for each source node in said set of source nodes, indicating an immediate or delayed transmission after sensing one or more acknowledgment messages sent by the destination node on all sub-bands of the communication channel.

10. The method according to claim 1, in which the message authorizing the sending of data on the communication channel by the source node includes an information field indicating the availability of the sub-bands.

11. A non-transitory computer readable medium that stores code instructions to execute the detection, selection and transmission steps according to claim 1 when said code instructions are executed on a computer.

12. A multiple access method to a frequency band of a communication channel of a communication network with carrier sensing and collision avoidance, said frequency band being broken down into a set of sub-bands of the communication channel, the method comprising at a destination node:
  detecting simultaneous messages requesting authorization to send data on the communication channel, said messages being transmitted by a plurality of source nodes on a plurality of sub-bands within the same communication channel;
  transmitting a message authorizing the sending of data on the communication channel through at least one source node among said plurality of source nodes, said message including an information field giving the number of messages requesting authorization to send data on the communication channel to be sent by each source node, each on a sub-band of the communication channel; and
  receiving the data transmitted by said at least one source node over all the sub-bands of the same communication channel,
  wherein the at least one source node is configured to perform an evaluation of a communication channel load, and depending on a result of said evaluation, a number of messages requesting authorization to send data on the communication channel transmitted by the at least one source node is modified or not after it has been detected that the communication channel is available.

13. A non-transitory computer readable medium that stores code instructions to execute the detection, selection and transmission steps according to claim 12 when said code instructions are executed on a computer.

14. A destination node in a multiple access communication network with one frequency band of a communication channel with carrier sensing and collision avoidance, including:
  processing circuitry configured to detect simultaneous messages requesting authorization to send data on the communication channel originating from a plurality of source nodes on a plurality of sub-bands of the frequency band of the same communication channel,
  a transmitter configured to transmit a message authorizing the sending of data on the communication channel through at least one source node among said plurality of source nodes, said message including an information field giving the number of messages requesting authorization to send data on the communication channel to be sent by each source node, each on a sub-band of the communication channel, and
  a receiver configured to receive the data transmitted by said at least one source node over all the sub-bands of the same communication channel,
  wherein the at least one source node is configured to perform an evaluation of a communication channel load, and depending on a result of said evaluation, a number of messages requesting authorization to send data on the communication channel transmitted by the at least one source node is modified or not after it has been detected that the communication channel is available.

15. A source node in a multiple access communication network with one frequency band of a communication channel with carrier sensing and collision avoidance, said frequency band being broken down into a set of sub-bands of the communication channel, including processing circuitry configured to detect availability of the communication channel, and a transmitter configured
  to transmit a plurality of messages requesting authorization to send data on the communication channel to a destination node, each one on a separate sub-band of the same communication channel, and
  after having received a message authorizing the sending of data on the communication channel by the source node, transmit the data to the destination node over all the sub-bands of the same communication channel,
  wherein the processing circuitry is further configured to perform an evaluation of a communication channel load, and depending on a result of said evaluation, a number of messages requesting authorization to send data on the communication channel transmitted by the source node is modified or not after it has been detected that the communication channel is available.

* * * * *